United States Patent
Choi et al.

(10) Patent No.: US 10,165,596 B2
(45) Date of Patent: Dec. 25, 2018

(54) METHOD AND APPARATUS FOR TRANSMITTING FRAME IN WIRELESS LOCAL AREA NETWORK

(71) Applicant: LG ELECTRONICS INC., Seoul (KR)

(72) Inventors: Jinsoo Choi, Seoul (KR); Jinyoung Chun, Seoul (KR); Wookbong Lee, Seoul (KR); Dongguk Lim, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/117,392

(22) PCT Filed: Jan. 2, 2015

(86) PCT No.: PCT/KR2015/000019
§ 371 (c)(1),
(2) Date: Aug. 8, 2016

(87) PCT Pub. No.: WO2015/119379
PCT Pub. Date: Aug. 13, 2015

(65) Prior Publication Data
US 2016/0353480 A1     Dec. 1, 2016

Related U.S. Application Data

(60) Provisional application No. 61/937,623, filed on Feb. 10, 2014, provisional application No. 61/938,086, (Continued)

(51) Int. Cl.
*H04W 74/08* (2009.01)
*H04W 52/58* (2009.01)
(Continued)

(52) U.S. Cl.
CPC ......... *H04W 74/0808* (2013.01); *H04L 43/16* (2013.01); *H04W 40/005* (2013.01);
(Continued)

(58) Field of Classification Search
CPC ..... H04W 52/04; H04W 52/06; H04W 52/24; H04W 52/241; H04W 52/243;
(Continued)

(56) References Cited

U.S. PATENT DOCUMENTS

2008/0008133 A1    1/2008  Zhu et al.
2008/0125160 A1*   5/2008  Zhu ..................... H04W 52/20
                                                      455/522
(Continued)

FOREIGN PATENT DOCUMENTS

CN    101243616    8/2008
CN    102769912    11/2012
(Continued)

OTHER PUBLICATIONS

European Patent Office Application Serial No. 15745949.6, Search Report dated Jun. 27, 2017, 7 pages.
(Continued)

*Primary Examiner* — Peter Chen
(74) *Attorney, Agent, or Firm* — Lee Hong Degerman Kang Waimey

(57) ABSTRACT

Disclosed is a method and an apparatus for transmitting a frame in a wireless local area network. A method for transmitting a frame in a wireless local area network may comprise the steps of: an STA, operating on the basis of TPC, transmitting a TPC configuration request frame to an AP, the TPC configuration request frame containing information for a TPC STA communication resource requested by the STA; the STA receiving, from the AP, a TPC configuration response frame as a response to the TPC configuration (Continued)

request frame, the TPC configuration response frame containing information for allocating requested TPC STA communication resource; and the STA transmitting the frame to the AP by means of the requested TPC STA communication resource.

8 Claims, 15 Drawing Sheets

Related U.S. Application Data filed on Feb. 10, 2014, provisional application No. 61/969,794, filed on Mar. 24, 2014.

(51) Int. Cl.
*H04L 12/26* (2006.01)
*H04W 40/00* (2009.01)
*H04W 52/54* (2009.01)
*H04W 84/12* (2009.01)

(52) U.S. Cl.
CPC ........... *H04W 52/54* (2013.01); *H04W 52/58* (2013.01); *H04W 74/08* (2013.01); *H04W 84/12* (2013.01)

(58) Field of Classification Search
CPC ... H04W 52/245; H04W 52/34; H04W 52/54; H04W 52/58; H04W 74/08; H04W 74/0808; H04W 74/0816; H04W 72/082; H04W 72/0473; H04W 84/12; H04W 88/08; H04W 40/16; H04W 40/005; H04L 43/16

See application file for complete search history.

(56) References Cited

U.S. PATENT DOCUMENTS

| | | | |
|---|---|---|---|
| 2008/0253314 A1 | 10/2008 | Stephenson et al. | |
| 2010/0002610 A1* | 1/2010 | Bowser | G06F 1/3203 370/311 |
| 2010/0046479 A1 | 2/2010 | Sampath et al. | |
| 2011/0059762 A1 | 3/2011 | Jones et al. | |
| 2013/0017794 A1* | 1/2013 | Kloper | H04W 74/0808 455/63.1 |
| 2015/0032868 A1* | 1/2015 | Sung | H04L 1/0021 709/221 |
| 2015/0163824 A1* | 6/2015 | Krzymien | H04W 28/18 370/338 |
| 2015/0319700 A1* | 11/2015 | Oteri | H04W 52/28 455/127.1 |
| 2016/0050674 A1* | 2/2016 | Kenney | H04W 84/12 370/329 |
| 2016/0165549 A1* | 6/2016 | Zhang | H04W 52/243 370/329 |

FOREIGN PATENT DOCUMENTS

| | | |
|---|---|---|
| EP | 2915382 | 9/2015 |
| JP | 2011234408 A | 11/2011 |
| KR | 1020110058825 A | 6/2011 |
| KR | 1020130100385 A | 9/2013 |
| WO | 2013190168 | 12/2013 |
| WO | 2014071308 | 5/2014 |

OTHER PUBLICATIONS

Fuemmeler, et al., "Selecting Transmit Powers and Carrier Sense Thresholds in CSMA Protocols for Wireless Ad Hoc Networks", XP058166706, Aug. 2006, 8 pages.

McDonald, "Refinements to the Frequency Hop CCA Criteria", IEEE P802.11-95/156, Jul. 1995, 8 pages.

Japan Patent Office Application No. 2016-551223, Office Action dated Aug. 22, 2017, 2 pages.

European Patent Office Application Serial No. 15745949.6, Office Action dated Mar. 16, 2018, 7 pages.

Alcatel-Lucent Shanghai Bell, Alcatel-Lucent, "Uplink Power Control Issues for Dense Deployment Scenarios of Small Cells", R1-130947, 3GPP TSG RAN WG1 Meeting #72bis, Apr. 2013, 3 pages.

State Intellectual Property Office of the People's Republic of China Application Serial No. 201580007936.X, Office Action dated Sep. 30, 2018, 7 pages.

* cited by examiner

FIG. 1
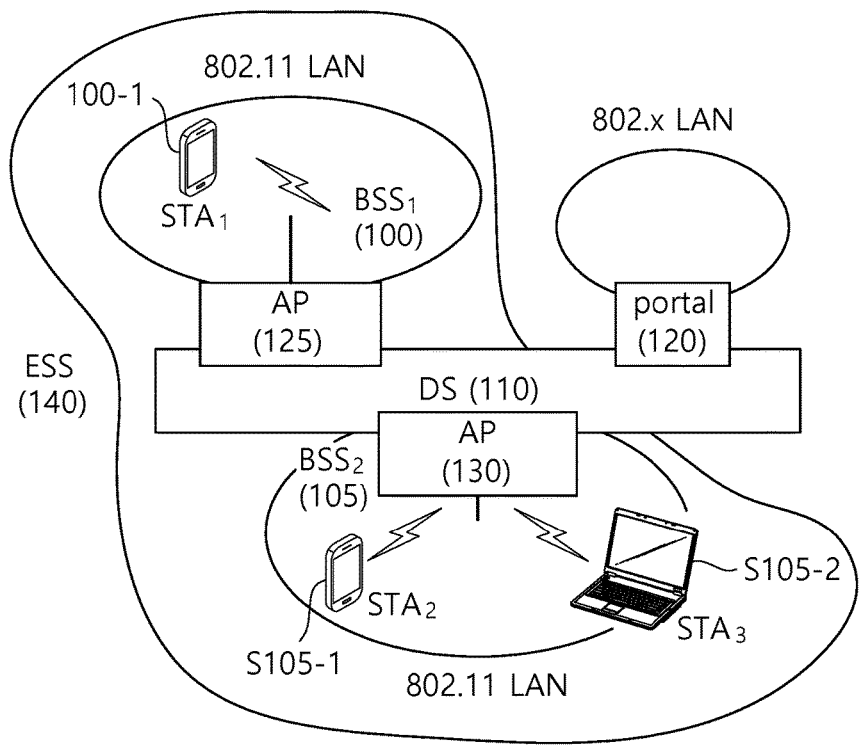
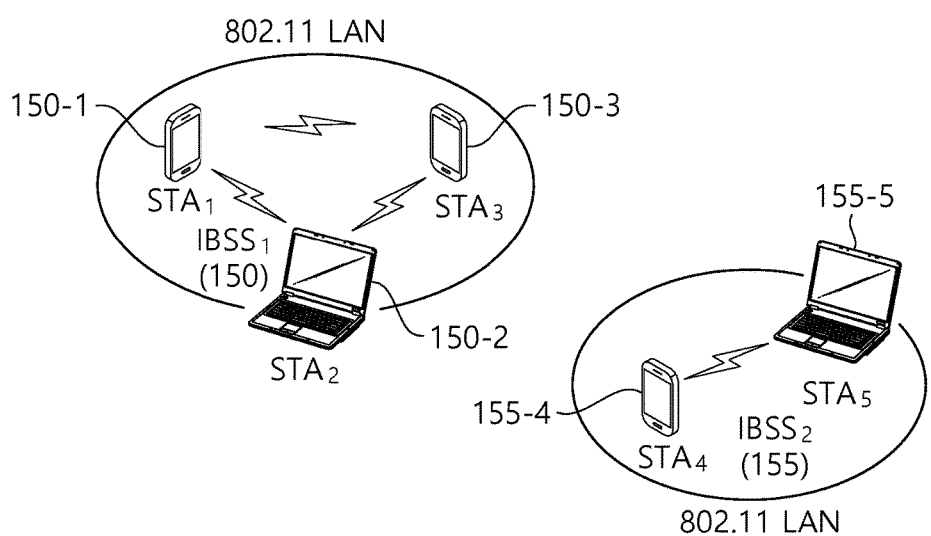

FIG. 7
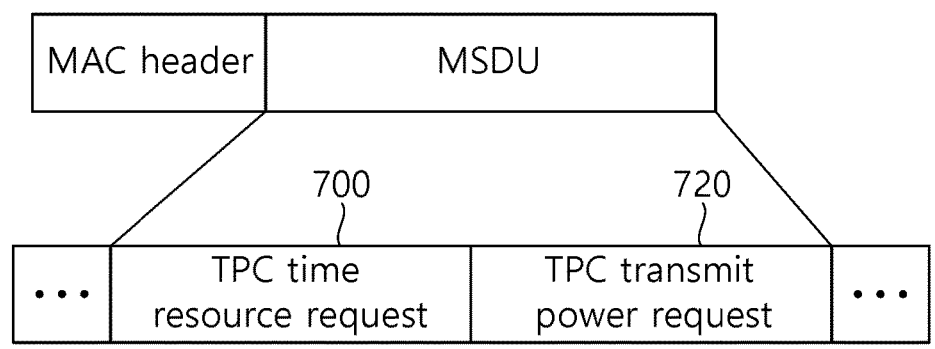
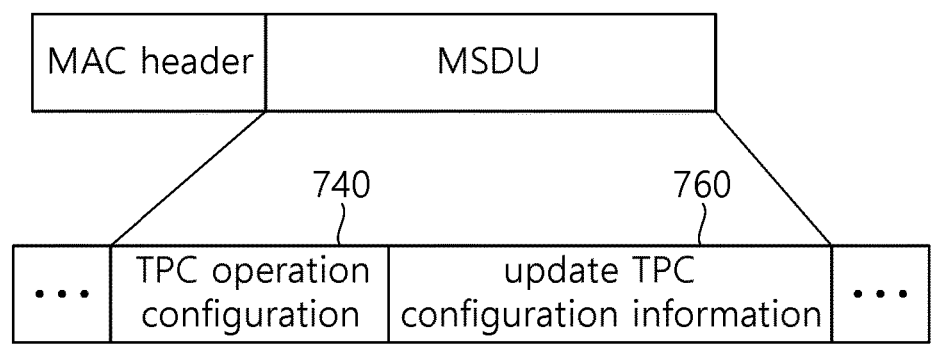

FIG. 10
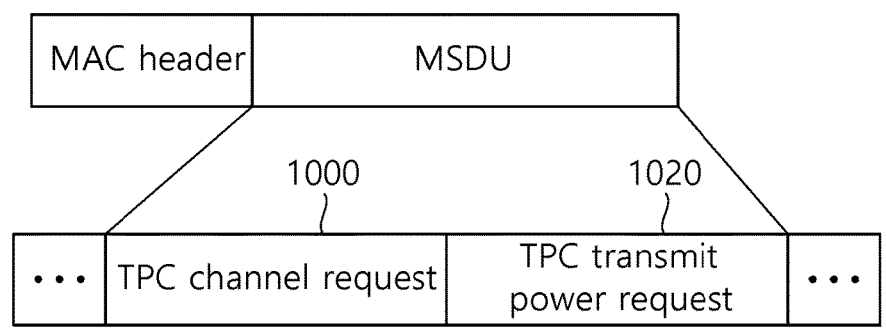
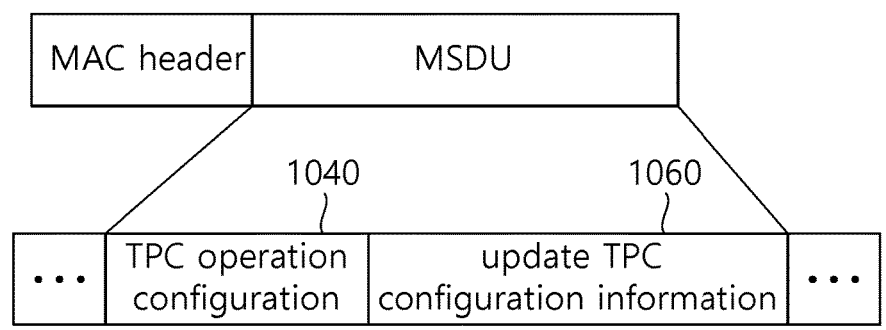

FIG. 12
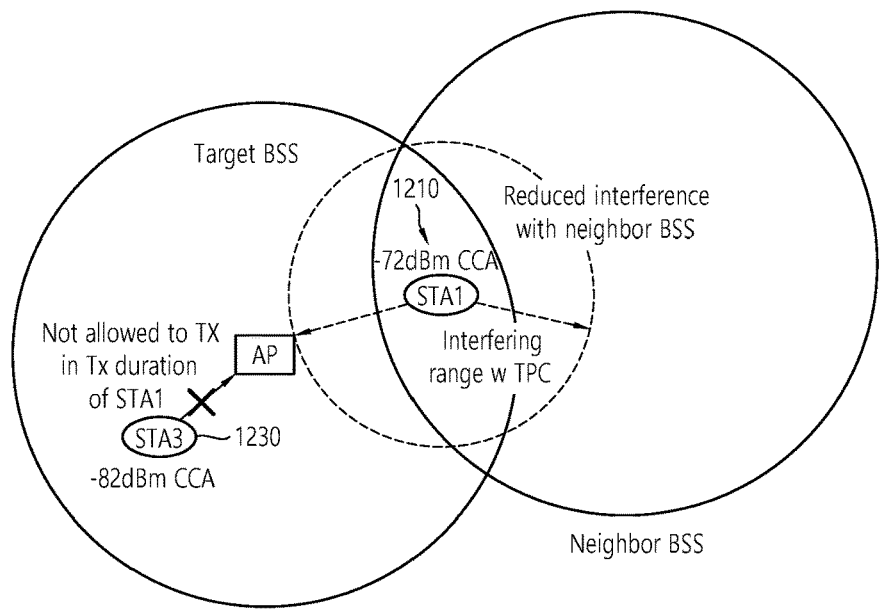
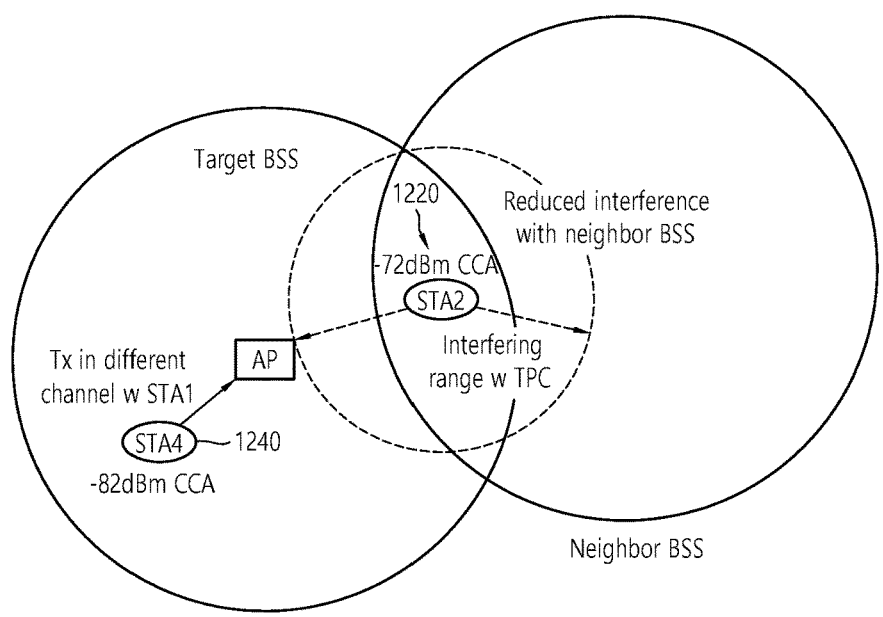

METHOD AND APPARATUS FOR TRANSMITTING FRAME IN WIRELESS LOCAL AREA NETWORK

CROSS-REFERENCE TO RELATED APPLICATIONS

This application is the National Stage filing under 35 U.S.C. 371 of International Application No. PCT/KR2015/000019, filed on Jan. 2, 2015, which claims the benefit of U.S. Provisional Application Nos. 61/937,623, filed on Feb. 10, 2014, 61/938,086, filed on Feb. 10, 2014 and 61/969,794, filed on Mar. 24, 2014, the contents of which are all hereby incorporated by reference herein in their entirety.

BACKGROUND OF THE INVENTION

Field of the Invention

The present invention relates to wireless communications, and more particularly, to a method and apparatus for transmitting a frame in a wireless local area network (WLAN).

Related Art

In a wireless local area network (WLAN) system, distributed coordination function (DCF) may be employed as a method enabling a plurality of stations (STAs) to share a wireless medium. DCF is based on a carrier sensing multiple access with collision avoidance (CSMA/CA).

Generally, in operations under a DCF access environment, when a medium is not occupied (that is, idle) for a DCF interframe space (DIFS) interval or longer, an STA may transmit a medium access control (MAC) protocol data unit (MPDU) to be urgently transmitted. When the medium is determined to be occupied according to a carrier sensing mechanism, an STA may determine the size of a contention window (CW) using a random backoff algorithm and perform a backoff procedure. The STA may select a random value in the CW to perform the backoff procedure and determine backoff time based on the selected random value.

When a plurality of STAs attempts to access a medium, an STA having the shortest backoff time among the STAs is allowed to access the medium and the other STAs may suspend the remaining backoff times and wait until the STA having accessed the medium finishes transmission. When the STA having accessed the medium finishes frame transmission, the other STAs contend again with the remaining backoff times to acquire a transmission resource. As such, in the existing WLAN system, one STA occupies the entire transmission resource through one channel to transmit/receive a frame to/from an AP.

In the WLAN system, the STA may determine whether a medium is busy or idle on the basis of clear channel assessment (CCA). That is, before the STA transmits a frame, whether the medium is used by another STA may be decided on the basis of the CCA. Whether to use the medium may be decided on the basis of a CCA threshold. A physical layer of the STA may report information regarding a channel state known through the CCA (information regarding whether to use the medium) to a medium access control (MAC) layer of the STA.

SUMMARY OF THE INVENTION

An object of the present invention is to provide a method of transmitting a frame in a wireless local area network (WLAN).

Another object of the present invention is to provide an apparatus for performing a method of transmitting a frame in a WLAN.

According to an aspect of the present invention for achieving the aforementioned object of the present invention, a method of transmitting a frame in a WLAN may include: transmitting, by a station (STA) operating based on transmit power control (TPC), a TPC configuration request frame to an access point (AP), wherein the TPC configuration request frame contains information on a TPC STA communication resource requested by the STA; receiving, by the STA, a TPC configuration response frame from the AP in response to the TPC configuration request frame, wherein the TPC configuration response frame contains information on allocation of the requested TPC STA communication resource; and transmitting, by the STA, the frame to the AP through the requested TPC STA communication resource, wherein a non-TPC STA not operating based on the TPC is restricted to use the requested TPC STA communication resource.

According to another aspect of the present invention for achieving the aforementioned object of the present invention, an STA for transmitting a frame in a WLAN may include: a radio frequency (RF) unit configured to transmit or receive a radio signal; and a processor operatively coupled to the RF unit, wherein the processor is configured for: transmitting a TPC configuration request frame to an AP for a TPC-based operation, wherein the TPC configuration request frame contains information on a TPC STA communication resource requested by the STA; receiving a TPC configuration response frame from the AP in response to the TPC configuration request frame, wherein the TPC configuration response frame contains information on allocation of the requested TPC STA communication resource; and transmitting the frame to the AP through the requested TPC STA communication resource, wherein a non-TPC STA not operating based on the TPC is restricted to use the requested TPC STA communication resource.

Communication efficiency of a station (STA) on a wireless local area network (WLAN) can be increased by adjusting transmit power of the STA and/or a clear channel assessment (CCA) threshold.

BRIEF DESCRIPTION OF THE DRAWINGS

FIG. 1 is a concept view illustrating the structure of a wireless local area network (WLAN).

FIG. 7 is a concept view illustrating a TPC configuration request frame and a TPC configuration response frame according to an embodiment of the present invention.

FIG. 10 is a concept view illustrating a TPC configuration request frame and a TPC configuration response frame according to an embodiment of the present invention.

FIG. 12 is a concept view illustrating a method of adjusting a transmission range and a CCA threshold of an STA by an AP according to an embodiment of the present invention.

DESCRIPTION OF EXEMPLARY EMBODIMENTS

FIG. 1 is a concept view illustrating the structure of a wireless local area network (WLAN).

An upper portion of FIG. 1 shows the structure of the IEEE (institute of electrical and electronic engineers) 802.11 infrastructure network.

Referring to the upper portion of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper portion of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower portion of FIG. 1 is a concept view illustrating an independent BSS.

Referring to the lower portion of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-1, and 155-2 are managed in a distributed manner. In the IBSS, all of the STAs 150-1, 150-2, 150-3, 155-1, and 155-2 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
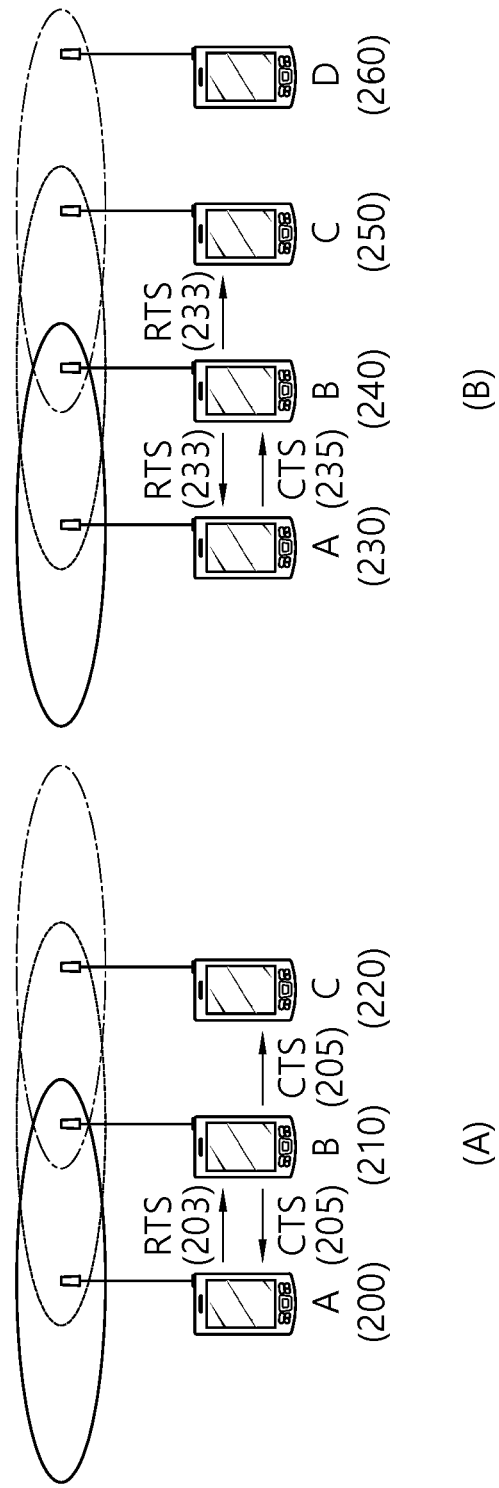
FIG. 2 is a concept view illustrating a method of using a request to send (RTS) frame and a clear to send (CTS) frame to solve a hidden node issue and an exposed node issue.

FIG. 2 is a concept view illustrating a method of using an RTS frame and a CTS frame to solve a hidden node issue and an exposed node issue.

Referring to FIG. 2, in order to solve the hidden node issue and the exposed node issue, a short signaling frame such as a request to send (RTS) frame, a clear to send (CTS) frame, or the like may be used. Neighboring STAs may know whether to transmit or receive data between two STAs on the basis of the RTS frame and the CTS frame.

FIG. 2(A) illustrates a method of transmitting an RTS frame 203 and a CTS frame 205 to solve a hidden node issue.

It may be assumed a case where both of an STA A 200 and an STA C 220 intend to transmit a data frame to an STA B 210. The STA A 200 may transmit the RTS frame 203 to the STA B 210 before transmission of the data frame, and the STA B 210 may transmit the CTS frame 205 to the STA A 200. The STA C 220 may overhear the CTS frame 205, and may know frame transmission from the STA A 200 to the STA B 210 through a medium. The STA C 220 may configure a network allocation vector (NAV) until the end of data frame transmission from the STA A 200 to the STA B 210. An inter-frame collision caused by a hidden node can be avoided by using this method.

FIG. 2(B) illustrates a method of transmitting an RTS frame 233 and a CTS frame 235 to solve an exposed mode issue.

An STA C 250 may determine whether a collision occurs when a frame is transmitted to another STA D 260 on the basis of monitoring of the RTS frame 233 and CTS frame 235 of an STA A 230 and an STAB 240.

The STA B 240 may transmit the RTS frame 233 to the STA A 230, and the STA A 230 may transmit the CTS frame 235 to the STA B 240. The STA C 250 overhears only the RTS frame 233 transmitted by the STA B 240, and fails to overhear the CTS frame 235 transmitted by the STA A 230. Therefore, the STA C 250 may know that the STA A 230 is located out of a carrier sensing range of the STA C 250. Accordingly, the STA C 250 may transmit data to the STA D 260.

An RTS frame format and a CTS frame format are disclosed in the 8.3.1.2 RTS frame format and 8.3.1.3 CTS frame format of IEEE P802.11-REVmcTM/D2.0, October 2013.

Hereinafter, transmission from an AP to an STA may be expressed as downlink transmission in an embodiment of the present invention. A physical layer protocol data unit (PPDU), frame, and data transmitted through downlink transmission may be respectively termed as a downlink PPDU, a downlink frame, and downlink data. The PPDU may be a data unit including a PPDU header and a physical layer service data unit (PSDU) (or a MAC protocol data unit (MPDU)). The PPDU header may include a PHY header and a PHY preamble, and the PSDU (or MPDU) may include or indicate a frame. On the contrary, transmission from the STA to the AP may be expressed as uplink transmission. A PPDU, frame, and data transmitted through uplink transmission may be respectively termed as an uplink PPDU, an uplink frame, and uplink data.

The conventional WLAN system is not much interested in transmit power control (TPC). This is because a WLAN system which uses not scheduling but a contention-based access (e.g., carrier sense multiple access with collision avoidance (CSMA/CA)) is characterized in that an adverse effect and capability deterioration are caused by the TPC.

Figure 3:
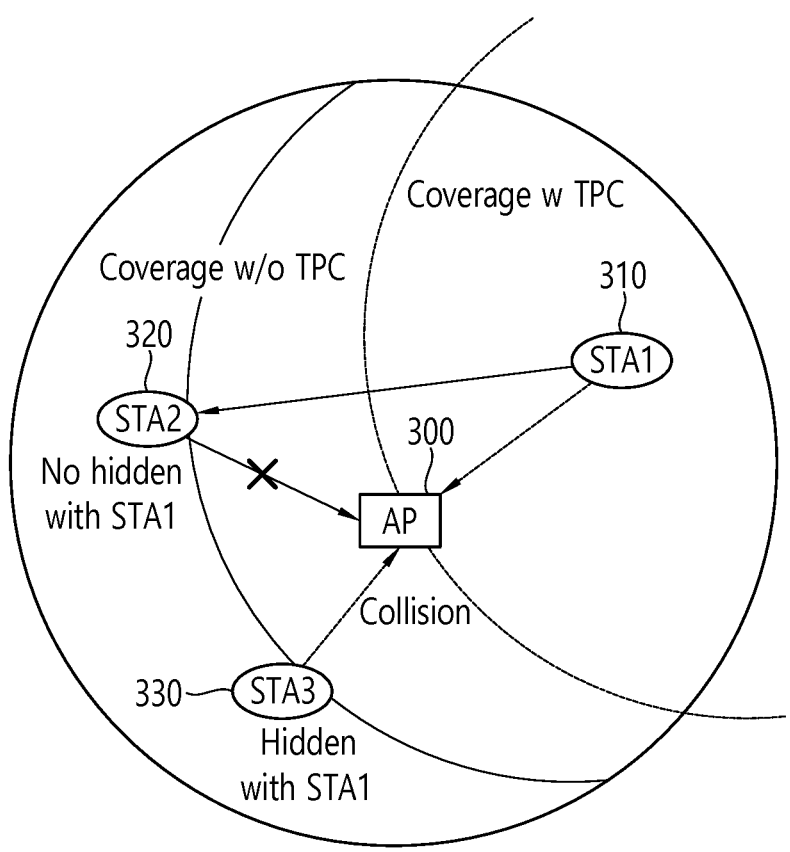
FIG. 3 is a concept view illustrating a problem which may be caused by transmit power control (TPC) in the conventional WLAN system.

FIG. 3 is a concept view illustrating a problem which may be caused by TPC in the conventional WLAN system.

Referring to FIG. 3, an STA1 310 operating based on the TPC may control transmit power to decrease transmit coverage. An STA3 330 which is another STA included in a BSS cannot discover a packet (or uplink frame) transmitted by the STA1 310 due to the decreased coverage of the STA1 310. That is, the STA3 330 cannot sense a channel occupied by the STA1 310 on the basis of CCA. The STA3 330 cannot know a medium occupied by the STA1 310, and may transmit an uplink frame to an AP 300 by performing channel access. In this case, a collision between an uplink frame transmitted by the STA1 310 and an uplink frame transmitted by the STA3 330 may occur in the AP 300.

An STA2 320 may be an STA which attempts channel access when the STA1 310 does not operate based on the TPC. When the STA1 310 does not perform the TPC, the STA2 320 may sense the channel occupied by the STA1 310 on the basis of the CCA. The STA2 320 may delay the channel access on the basis of a sensing result based on the CCA.

That is, when transmit coverage of an STA is decreased due to a TPC-based operation, an inter-frame collision may occur.

Figure 4:
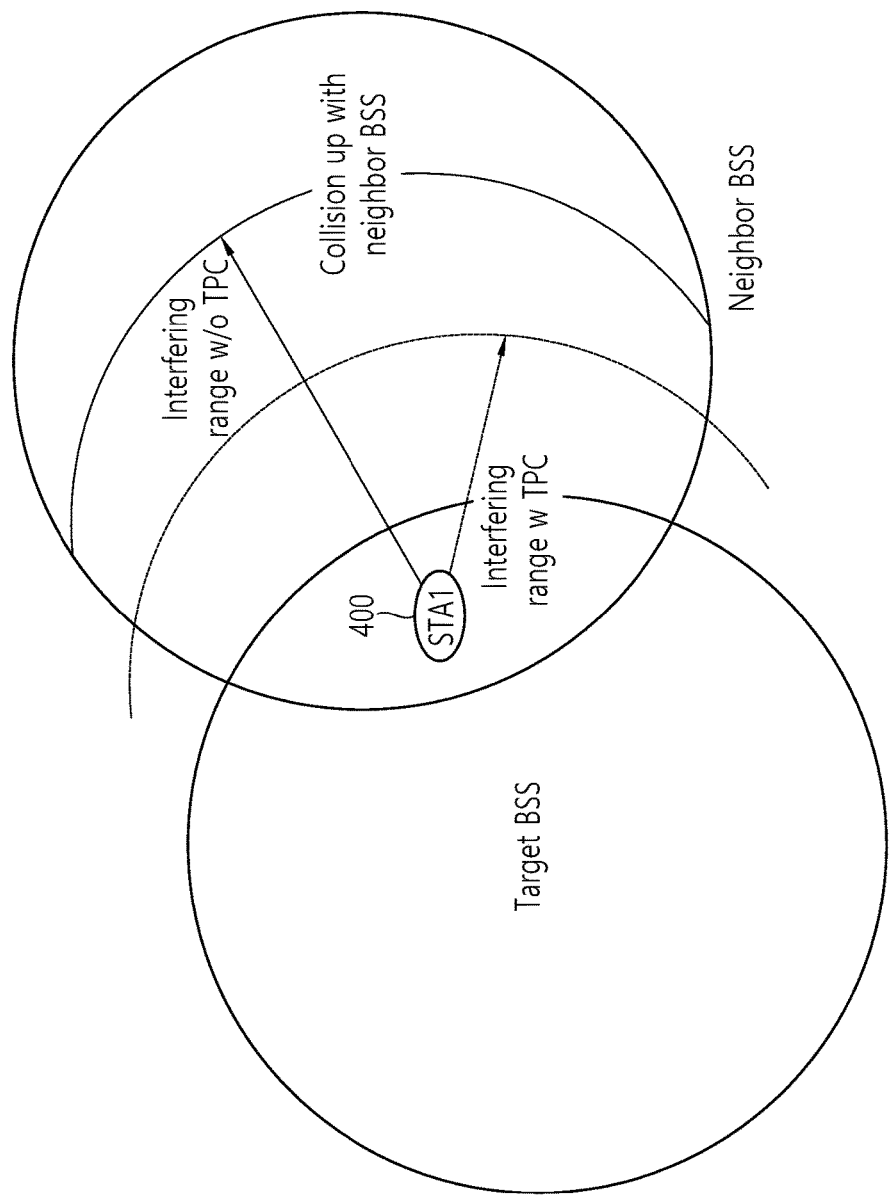
FIG. 4 is a concept view illustrating an interference decreased when TPC is applied in a WLAN system.

FIG. 4 is a concept view illustrating an interference decreased when TPC is applied in a WLAN system.

In FIG. 4, an interference which may occur in a neighbor BSS is disclosed according to whether an STA operates based on the TPC.

Referring to FIG. 4, when an STA1 400 included in a target BSS transmits an uplink frame, the uplink frame transmitted by the STA1 400 may act as an interference to a neighbor BSS of the target BSS.

When the STA1 400 operates based on the TPC, an interference which may occur due to transmission of the uplink frame of the STA1 400 may be less than an interfering range which may be caused due to transmission of the uplink frame of the STA1 400 not operating based on the TPC. That is, when the TPC is used, an interference to the neighbor BSS and caused by the STA1 400 may be decreased.

The TPC is one of important technologies capable of decreasing an inter-BSS interference in a multi-cell environment. In particular, the TPC is one of elementary technologies which are necessarily considered in a dense deployment scenario in which a great number of APs and STAs co-exist.

When channel access is performed based on CSMA-CA in the WLAN system, the STA may determine whether a medium is occupied (or whether the channel is busy or idle) on the basis of a CCA threshold. The CCA threshold may be configured on the basis of a minimum receiver sensitivity of an STA (or AP) configured in the system. If strength of a signal sensed in the medium is greater than or equal to the CCA threshold, the STA may determine a state of the medium as a busy state. On the contrary, if the strength of the signal sensed in the medium is less than the CCA threshold, the STA may determine the state of the medium as an idle state.

In the conventional WLAN system, all STAs may operate based on the same CCA threshold with respect to the same bandwidth. If the CCA threshold is not properly configured in the WLAN system, system capability may be limited in terms of resource usage capability.

Hereinafter, an embodiment of the present invention discloses a TPC-based operation method and/or CCA threshold configuration method capable of effectively improving system capability.

Figure 5:
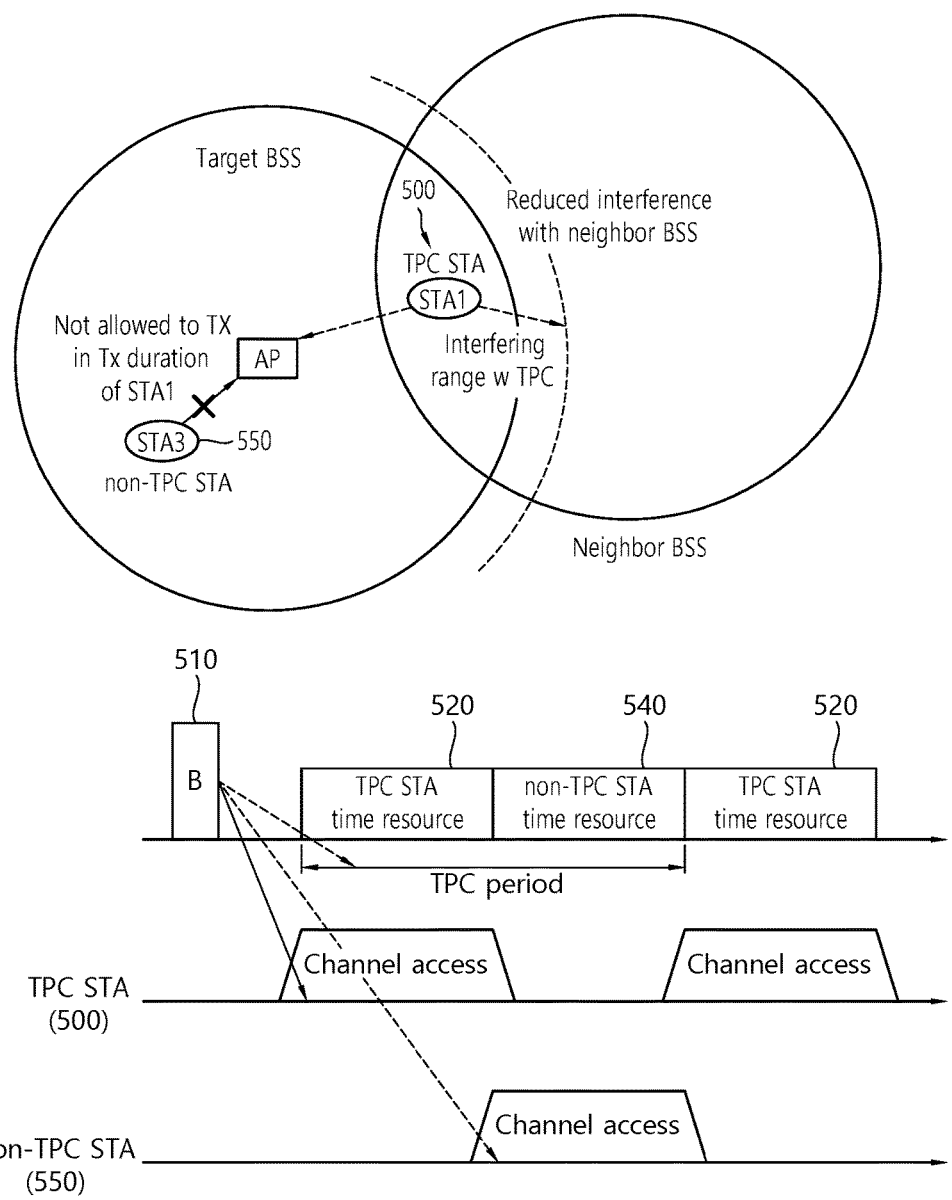
FIG. 5 is a concept view illustrating an operation of a station (STA) based on TPC according to an embodiment of the present invention.

FIG. 5 is a concept view illustrating an operation of an STA based on TPC according to an embodiment of the present invention.

In FIG. 5, it is disclosed a method of allocating a separate transmission resource for an STA operating based on the TPC and an STA not operating based on the TPC (or an STA operating based on non-TPC). Hereinafter, the STA operating based on the TPC may be termed as a TPC STA 500, and an STA not operating based on the TPC may be termed as a non-TPC STA 550.

Referring to FIG. 5, an AP may configure a time resource for the non-TPC STA 550 (in other words, an operation duration of the non-TPC STA, a channel access duration or non-TPC interval of the non-TPC STA) and a time resource for the TPC STA 500 (in other words, an operation duration of the TPC STA, a channel access duration or TPC interval of the TPC STA) such that the time resources do not overlap (or are separated).

Hereinafter, a time resource for the non-TPC STA 550 may be termed as a non-TPC STA time resource 540, and a time resource for the TPC STA 500 may be termed as a TPC STA time resource 520.

The AP may configure the TPC STA time resource 520, and may transmit information regarding the TPC STA time resource 520 to the TPC STA 500 and the non-TPC STA 550. A frame including the information regarding the TPC STA time resource 520 may be transmitted to an STA in a BSS in a broadcast manner.

The TPC STA 500 may perform channel access on the TPC STA time resource 520 to communicate with the AP, and the non-TPC STA 550 may perform channel access on the non-TPC STA time resource 540 to communicate with the AP.

More specifically, the TPC STA 500 may proceed the procedure of configuring the TPC-based operation with respect to the AP. For example, the TPC STA time resource 520 and transmit power of the TPC STA may be determined through the procedure of configuring the TPC-based operation. After the procedure of configuring the TPC-based operation is complete between the TPC STA 500 and the AP, the AP may transmit information related to the TPC-based operation configured on the basis of the procedure of configuring the TPC-based operation (e.g., TPC STA time resource information, TPC STA's transmit power information) by using a method of broadcasting to a plurality of STAs in the BSS. For example, a beacon frame 510 transmitted by the AP may include the information related to the TPC-based operation.

Figure 6:
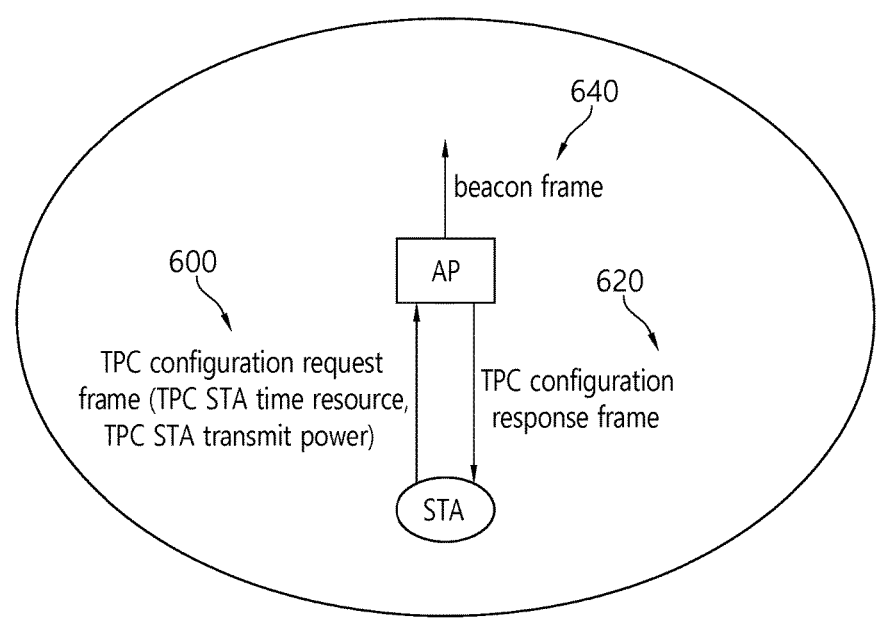
FIG. 6 is a concept view illustrating a procedure of configuring a TPC-based operation according to an embodiment of the present invention.

FIG. 6 is a concept view illustrating a procedure of configuring a TPC-based operation according to an embodiment of the present invention.

Hereinafter, although a method of determining the TPC STA time resource and the TPC STA's transmit power is disclosed in the procedure of configuring the TPC-based operation, only one of the TPC STA time resource and the TPC STA's transmit power may be determined through the procedure of configuring the TPC-based operation.

Referring to FIG. 6, the TPC STA may transmit a TPC configuration request frame (or TPC interval request frame) 600. The TPC configuration request frame 600 may include information regarding the TPC STA time resource requested by the TPC STA and information regarding the TPC STA's transmit power. The TPC STA may determine the TPC STA time resource and TPC STA's transmit power used for transmission of an uplink frame, and may transmit the TPC configuration request frame 600 including the information regarding the TPC STA time resource and the information regarding the TPC STA's transmit power.

The TPC configuration request frame 600 is an RTS frame. The information regarding the TPC STA time resource and/or the information regarding the TPC STA's transmit power may be transmitted by being included in the RTS frame.

The AP may transmit a TPC configuration response frame 620 to the STA in response to the TPC configuration request frame 600. The TPC configuration response frame 620 may include information regarding whether to accept/reject/update the TPC STA time resource and TPC STA's transmit power requested by the TPC configuration request frame 600. When the AP determines to update the TPC STA time resource and TPC STA's transmit power requested by the TPC configuration request frame 600, information regarding the TPC STA time resource and TPC STA's transmit power determined by the AP may be included in the TPC configuration response frame 620.

To determine whether to accept/reject/update the TPC STA time resource and TPC STA's transmit power requested by the TPC configuration request frame 600, the AP may consider a channel environment between the STA and the AP.

For example, the AP may determine whether to accept/reject/update the TPC STA time resource and TPC STA's transmit power requested by the TPC configuration request frame 600 on the basis of STA's transmit power for the TPC configuration request frame 600 and AP's receive power for the TPC configuration request frame 600 (e.g., received signal to interference plus noise ratio (SINR) (or received signal strength indication (RSSI)).

When it is determined to accept the TPC STA time resource and TPC STA's transmit power requested by the TPC configuration request frame 600, the AP may transmit the TPC configuration response frame 620 including acceptance indication information to the STA. In this case, the STA may operate on the basis of the TPC STA time resource and TPC STA's transmit power requested by the TPC configuration request frame 600.

If it is determined to update the TPC STA time resource and TPC STA's transmit power requested by the TPC configuration request frame 600, the AP may transmit to the STA the TPC configuration response frame 620 including update indication information and the TPC STA time resource and/or TPC STA's transmit power determined (updated) by the AP. In this case, the STA may operate on the basis of the TPC STA time resource and/or TPC STA's transmit power determined (updated) by the AP. When only one of the TPC STA time resource and the TPC STA's transmit power is updated, the other one may be determined as requested by the TPC configuration request frame 600.

If it is determined to reject the TPC STA time resource and TPC STA's transmit power requested by the TPC configuration request frame 600, the AP may transmit to the STA the TPC configuration response frame 620 including rejection indication information. In this case, the STA may not perform the TPC-based operation but may operate in a non-TPC based manner.

If it is determined to accept or update the TPC STA time resource and TPC STA's transmit power requested by the TPC configuration request frame 600, the AP may transmit information regarding the TPC STA time resource and the TPC STA's transmit power to the STA in the BSS in a broadcast manner. For example, a beacon frame 640 transmitted periodically by the AP for passive scanning may include information regarding the TPC STA time resource and the TPC STA's transmit power. Upon receiving the beacon frame 640, non-TPC STAs in the BSS may not perform channel access and uplink frame transmission on the TPC STA time resource.

More specifically, after completion of the procedure of configuring the TPC-based operation with respect to the TPC STA, the AP may transmit a frame including information regarding the TPC STA time resource (a TPC time resource start time, a TPC time resource end time, a TPC time resource duration, etc.) and information regarding the TPC STA's transmit power in the BSS in a broadcast manner.

According to an embodiment of the present invention, the AP and the STA may negotiate (or confirm) whether to support the TPC-based operation in an initial access procedure.

For example, in an association procedure, an association request frame transmitted by the TPC STA in which the TPC-based operation is possible may include information regarding capability for the TPC-based operation. The AP may transmit to the STA an association response frame transmitted in response to the association request frame by including information regarding whether the TPC-based operation is possible (supported).

If the TPC-based operation is not supported in the AP (or BSS), the TPC STA may not be able to perform the TPC-based operation, and may operate based on non-TPC. The TPC STA operating based on the non-TPC may not control transmit power but perform channel access on a time resource overlapping with the non-TPC STA. Alternatively, if the TPC-based operation is not supported, the AP (or BSS) may scan another AP (or BSS) supporting the TPC-based operation.

In another method, the AP may transmit information regarding whether to support the TPC-based operation by the AP (or in the BSS) through a beacon frame. Regarding an STA which performs access scanning and thus does not receive the beacon frame, the AP may transmit the information regarding whether to support the TPC-based operation through the probe response frame transmitted in response to the probe request frame.

FIG. 7 is a concept view illustrating a TPC configuration request frame and a TPC configuration response frame according to an embodiment of the present invention.

Referring to an upper portion of FIG. 7, the TPC configuration request frame may include a TPC time resource request field 700 and a TPC transmit power request field 720.

The TPC time resource request field 700 may include information regarding a TPC STA time resource requested by a TPC STA. For example, the TPC time resource request field 700 may include information regarding a TPC time resource start time, a TPC time resource end time, a TPC time resource duration, etc.

The TPC transmit power request field 720 may include information regarding transmit power requested by the TPC STA.

Referring to a lower portion of FIG. 7, the TPC configuration response frame may include a TPC operation configuration field 740. The TPC operation configuration field 740 may include information indicating whether to accept/reject/update the TPC STA time resource and TPC STA's transmit power requested by the TPC configuration request frame.

If the TPC operation configuration field 740 indicates to update the TPC STA time resource or TPC STA's transmit power requested by the TPC configuration request frame, an update TPC configuration information field 760 may include information regarding the TPC STA time resource or TPC STA's transmit power updated (or determined by the AP).

If the TPC operation configuration field 740 indicates to accept or reject the TPC STA time resource or TPC STA's transmit power requested by the TPC configuration request frame, the update TPC configuration information field 760 may include null data.

Figure 8:
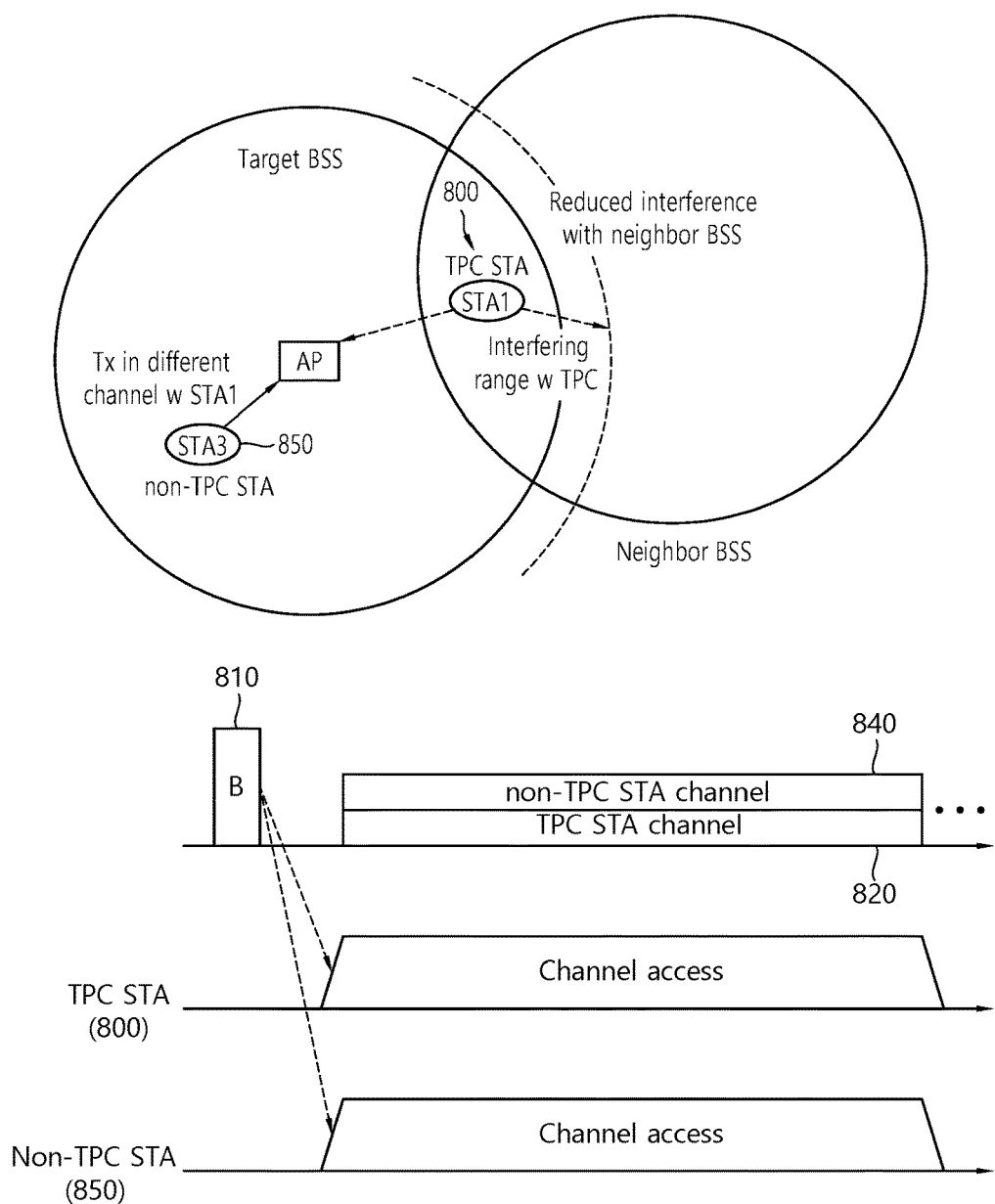
FIG. 8 is a concept view illustrating a procedure of configuring a TPC-based operation according to an embodiment of the present invention.

FIG. 8 is a concept view illustrating a procedure of configuring a TPC-based operation according to an embodiment of the present invention.

In FIG. 8, it is disclosed a method of allocating a separate transmission resource for a TPC STA 800 and a non-TPC STA 850.

Referring to FIG. 8, an operating channel (an operating frequency resource or an operating subband) of the TPC STA 800 and an operating channel (an operating frequency resource or an operating subband) of the non-TPC STA 850 may be configured to be different from each other. An AP may configure a channel for the non-TPC STA 850 and a channel for the TPC STA 800 such that the channels do not overlap (or are separated).

Hereinafter, the channel for the non-TPC STA 850 may be termed as a non-TPC STA channel 840, and the channel for the TPC STA 800 may be termed as a TPC STA channel 820.

The AP may configure the TPC STA channel 820, and may transmit information regarding the TPC STA channel 820 (e.g., channel index information) to the TPC STA 800 and the non-TPC STA 850. A frame including the information regarding the TPC STA channel 820 may be transmitted to an STA in a BSS in a broadcast manner.

The TPC STA 800 may perform channel access through the TPC STA channel 820 to communicate with the AP, and the non-TPC STA 850 may perform channel access through the non-TPC STA channel 840 to communicate with the AP. The TPC STA channel 820 or the non-TPC STA channel 840 may be changed during an operation of the TPC STA 800 or the non-TPC STA 850. In this case, the TPC STA 800 or the non-TPC STA 850 may transmit a channel switch notification frame and may perform a switching operation by switching (or jumping) to the configured TPC STA channel 820 or the non-TPC STA channel 840. Communication with the AP and the TPC STA 800 on the TPC STA channel 820 and communication with the AP and the non-TPC STA 850 on the non-TPC STA channel 840 may be performed on an overlapping time resource on the basis of orthogonal frequency division multiple access (OFDMA). The AP may transmit a downlink frame to the TPC STA 800 through the TPC STA channel 820 on the basis of the OFDMA, and may transmit a downlink frame to the TPC STA 800 through the non-TPC STA channel 840.

The non-TPC STA 850 may perform channel access or transmit an uplink frame through a primary channel (or a channel including a primary channel). In this case, the TPC STA channel 820 may be configured as a non-primary channel (or one of secondary channels) other than the primary channel.

For an operation on the TPC STA channel 820 of the TPC STA 800, the TPC STA 800 may perform a procedure of configuring a TPC-based operation with respect to the AP. For example, the TPC STA channel 820 and transmit power of the TPC STA 800 may be determined through the procedure of configuring the TPC-based operation. After the procedure of configuring the TPC-based operation between the TPC STA 800 and the AP, the AP may transmit information related to the TPC-based operation configured on the basis of the procedure of configuring the TPC-based operation (e.g., TPC STA channel information, TPC STA's transmit power information) to a plurality of STAs in the BSS.

According to an embodiment of the present invention, a time duration in which the TPC-based operation is supported may be configured. The TPC STA 800 and the non-TPC STA 850 may operate on different channels only in the time duration in which the TPC-based operation is supported. In this case, when performing the procedure of configuring the TPC-based operation with respect to the AP, the TPC STA 800 may also configure the time duration in which the TPC-based operation is supported.

Figure 9:
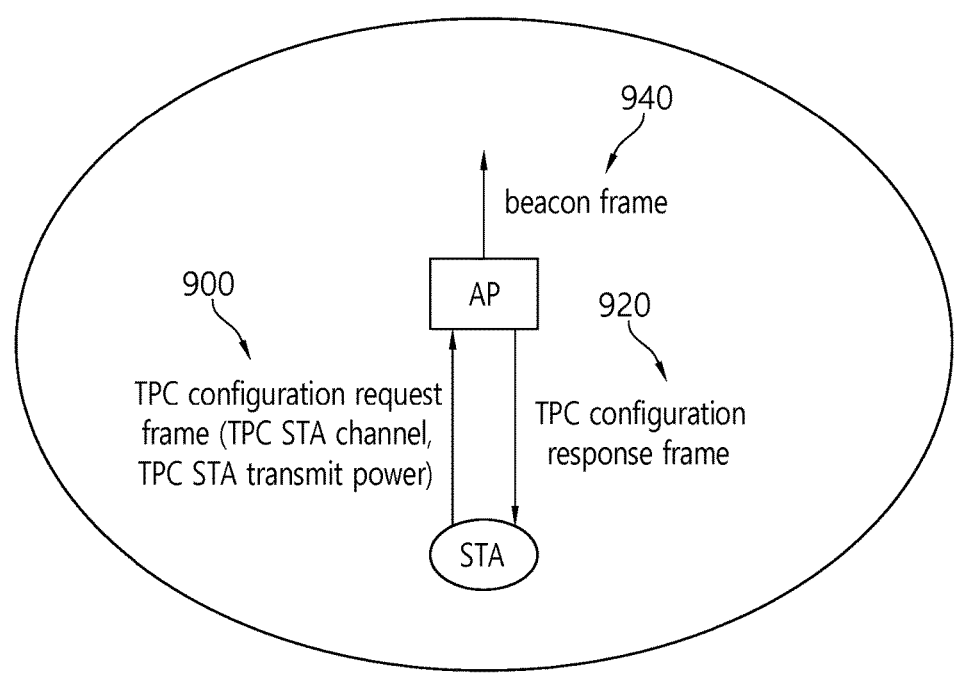
FIG. 9 is a concept view illustrating a procedure of configuring a TPC-based operation according to an embodiment of the present invention.

FIG. 9 is a concept view illustrating a procedure of configuring a TPC-based operation according to an embodiment of the present invention.

Hereinafter, although a method of determining the TPC STA channel and the TPC STA's transmit power is disclosed in the procedure of configuring the TPC-based operation, only one of the TPC STA channel and the TPC STA's transmit power may be determined through the procedure of configuring the TPC-based operation.

Referring to FIG. 9, the TPC STA may transmit a TPC configuration request frame (or TPC interval request frame) 900. The TPC configuration request frame 900 may include information regarding the TPC STA channel requested by the TPC STA and information regarding the TPC STA's transmit power. The TPC STA may determine the TPC STA channel and TPC STA's transmit power used for transmission of an uplink frame, and may transmit the TPC configuration request frame 900 including the information regarding the TPC STA channel and the information regarding the TPC STA's transmit power.

The TPC configuration request frame 900 is an RTS frame. The information regarding the TPC STA channel and/or the information regarding the TPC STA's transmit power may be transmitted by being included in the RTS frame.

The AP may transmit a TPC configuration response frame 920 to the STA in response to the TPC configuration request frame 900. The TPC configuration response frame 920 may include information regarding whether to accept/reject/update the TPC STA channel and TPC STA's transmit power requested by the TPC configuration request frame. When the AP determines to update the TPC STA channel and TPC STA's transmit power requested by the TPC configuration request frame 900, information regarding the TPC STA channel and TPC STA's transmit power determined by the AP may be included in the TPC configuration response frame 920.

To determine whether to accept/reject/update the TPC STA channel and TPC STA's transmit power requested by the TPC configuration request frame 900, the AP may consider a channel environment between the STA and the AP.

For example, the AP may determine whether to accept/reject/update the TPC STA channel and TPC STA's transmit power requested by the TPC configuration request frame on the basis of transmit power of the TPC configuration request frame 900 and receive power of the TPC configuration request frame 900 (e.g., received signal to interference plus noise ratio (SINR) (or received signal strength indication (RSSI)).

When it is determined to accept the TPC STA channel and TPC STA's transmit power requested by the TPC configuration request frame 900, the AP may transmit the TPC configuration response frame 920 including acceptance indication information to the STA. In this case, the STA may operate on the basis of the TPC STA channel and TPC STA's transmit power requested by the TPC configuration request frame 900.

If it is determined to update the TPC STA channel and TPC STA's transmit power requested by the TPC configuration request frame 900, the AP may transmit to the STA the TPC configuration response frame 920 including update indication information and the TPC STA channel and/or TPC STA's transmit power determined (updated) by the AP. In this case, the STA may operate on the basis of the TPC STA channel and/or TPC STA's transmit power determined (updated) by the AP. When only one of the TPC STA channel and the TPC STA's transmit power is updated, the other one may be determined as requested by the TPC configuration request frame 900.

If it is determined to reject the TPC STA channel and TPC STA's transmit power requested by the TPC configuration request frame 900, the AP may transmit to the STA the TPC configuration response frame 920 including rejection indication information. In this case, the STA may not perform the TPC-based operation but may operate in a non-TPC based manner.

If it is determined to accept or update the TPC STA channel and TPC STA's transmit power requested by the TPC configuration request frame 900, the AP may transmit information regarding the TPC STA channel and the TPC STA's transmit power to the STA in the BSS in a broadcast manner. For example, a beacon frame 940 transmitted periodically by the AP for passive scanning may include information regarding the TPC STA channel and the TPC STA's transmit power. Upon receiving the beacon frame 940, non-TPC STAs in the BSS may not perform channel access and uplink frame transmission on the TPC STA channel.

More specifically, after completion of the procedure of configuring the TPC-based operation with respect to the TPC STA, the AP may transmit a frame including information regarding the TPC STA channel and information regarding the TPC STA's transmit power in the BSS in a broadcast manner.

Likewise, according to an embodiment of the present invention, the AP and the STA may negotiate (or confirm) whether to support the TPC-based operation in an initial access procedure.

For example, in an association procedure, an association request frame transmitted by the TPC STA in which the TPC-based operation is possible may include information regarding capability for the TPC-based operation. The AP may transmit to the STA an association response frame transmitted in response to the association request frame by including information regarding whether the TPC-based operation is possible (supported).

If the TPC-based operation is not supported in the AP (or BSS), the TPC STA may not be able to perform the TPC-based operation, and may operate based on non-TPC. The TPC STA operating based on the non-TPC may not control transmit power but perform channel access on a time resource overlapping with the non-TPC STA. Alternatively, if the TPC-based operation is not supported, the AP (or BSS) may scan another AP (or BSS) supporting the TPC-based operation.

In another method, the AP may transmit information regarding whether to support the TPC-based operation by the AP (or in the BSS) through a beacon frame. Regarding an STA which performs access scanning and thus does not receive the beacon frame, the AP may transmit the information regarding whether to support the TPC-based operation through the probe response frame transmitted in response to the probe request frame.

According to an embodiment of the present invention, the time duration in which the TPC-based operation is supported may also be configured when performing the procedure of configuring the TPC-based operation. In this case, the TPC configuration request frame may further include information regarding the TPC STA time resource, and the TPC configuration response frame may include information regarding whether to accept/reject/update the requested TPC STA time resource.

Further, after completion of the procedure of configuring the TPC-based operation with respect to the TPC STA, the AP may transmit a frame including information regarding the TPC STA channel (a TPC channel start time, a TPC channel end time, a TPC channel duration, etc.) and information regarding the TPC STA's transmit power in the BSS in a broadcast manner.

FIG. 10 is a concept view illustrating a TPC configuration request frame and a TPC configuration response frame according to an embodiment of the present invention.

Referring to an upper portion of FIG. 10, the TPC configuration request frame may include a TPC channel request field 1000 and a TPC transmit power request field 1020.

The TPC channel request field 1000 may include information regarding a TPC STA channel requested by a TPC STA. For example, the TPC channel request field 1000 may include channel index information indicating the TPC STA channel.

The TPC transmit power request field 1020 may include information regarding transmit power requested by the TPC STA.

Referring to a lower portion of FIG. 10, the TPC configuration response frame may include a TPC operation configuration field 1040. The TPC operation configuration field 1040 may include information indicating whether to accept/reject/update the TPC STA channel resource and TPC STA's transmit power requested by the TPC configuration request frame.

If the TPC operation configuration field 1040 indicates to update the TPC STA channel resource or TPC STA's transmit power requested by the TPC configuration request frame, an update TPC configuration information field 1060 may include information regarding the TPC STA channel or TPC STA's transmit power updated (or determined by the AP).

If the TPC operation configuration field 1040 indicates to accept or reject the TPC STA channel or TPC STA's transmit power requested by the TPC configuration request frame, the update TPC configuration information field 1060 may include null data.

According to an embodiment of the present invention, when the procedure of configuring the TPC-based operation is performed, a time duration supporting not only the TPC STA channel but also the TPC-based operation may also be configured. In this case, the TPC configuration request frame may further include the TPC time resource request field. The TPC time resource request field may include information regarding the TPC STA time resource requested by the TPC STA. Further, the TPC configuration response frame may further include information regarding whether to accept/reject/update the TPC STA time resource requested by the TPC STA.

Figure 11:
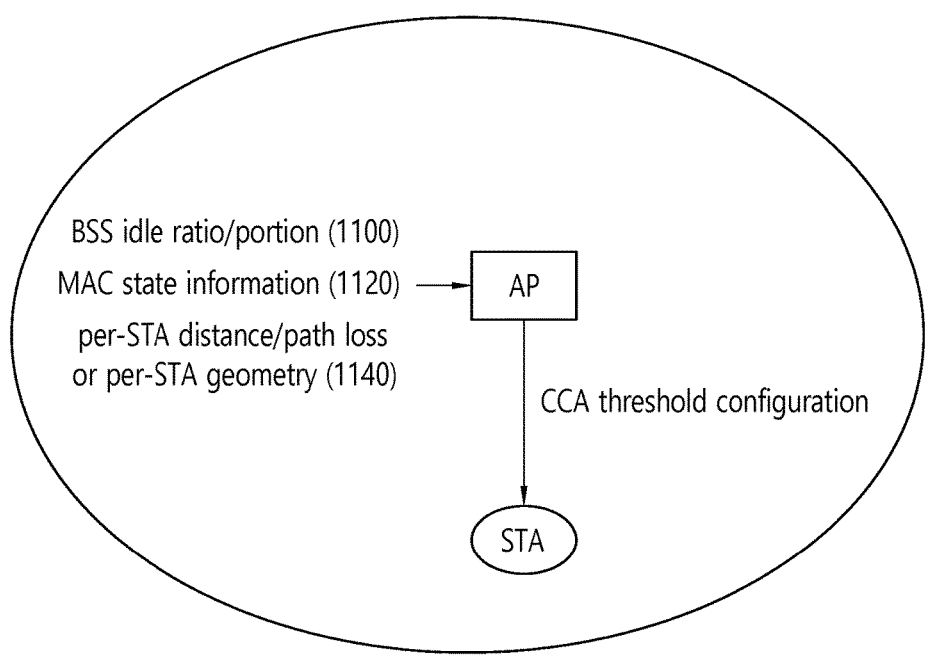
FIG. 11 is a concept view illustrating a method of configuring a clear channel assessment (CCA) threshold of an access point (AP) according to an embodiment of the present invention.

FIG. 11 is a concept view illustrating a method of configuring a CCA threshold of an AP according to an embodiment of the present invention.

In FIG. 11, it is disclosed a method in which an AP configures a CCA threshold of an STA included in a BSS. The AP may configure the CCA threshold in unit of the BSS by equally configuring the CCA threshold of the STA, or may configure the CCA threshold for each STA. The CCA threshold configured in unit of the BSS may be termed as a CCA threshold of the BSS.

Referring to FIG. 11, the AP may determine the CCA threshold of the BSS on the basis of a communication environment of the BSS. Further, the AP may also determine the CCA threshold of the STA on the basis of a communication environment for each STA.

For example, the CCA threshold of the BSS may be determined according to a channel state in the BSS. That is, the CCA threshold of the BSS may be a configurable value. For example, the CCA threshold (the CCA threshold of the BSS or the CCA threshold of the STA) may be determined on the basis of at least one of a BSS idle ratio/portion 1100, MAC state information 1120, and per-STA distance/path loss or per-STA geometry information 1140.

The BSS idle ratio/portion 1100 may be determined based on a transmit (Tx) opportunity for downlink transmission and/or uplink transmission of the BSS.

An inter-BSS mutual interference may occur in an environment where a plurality of BSSs coexist. Even if a different STA other than the STA in a specific BSS and an AP do not attempt channel access or data transmission, the STA in the specific BSS may be interfered by a different BSS (e.g., an overlapped basic service set (BSS)).

For example, the STA (or AP, hereinafter, the STA is assumed in the description) may decide whether a medium is idle or busy to perform channel access. More specifically, the STA may decide whether the medium is idle on the basis of a CCA threshold to transmit pending uplink data (or transmission packet). If a signal having strength greater than or equal to the CCA threshold is sensed through the medium, the STA may decide that the medium is busy. On the contrary, if a signal having strength less than the CCA threshold is sensed through the medium, the STA may decide that the medium is idle. If the medium is idle as a result of determining the medium of the STA, the STA may transmit an uplink frame to the AP. That is, the STA has a real Tx opportunity after comparing the CCA on the basis of the CCA threshold. Therefore, according to a magnitude of the CCA threshold configured by the STA, a state (busy, idle) of the medium of the STA may be decided differently.

The STA (or AP) may determine the BSS idle ratio/portion 1100 on the basis of whether the medium is idle when performing channel access.

The AP may measure the BSS idle ratio/portion 1100 during a specific period. Alternatively, the AP may acquire information regarding the BSS idle ratio/portion 1100 from a BSS coordinator and a network manager. For example, the BSS coordinator and the network manager may acquire the information regarding the BSS idle ratio/portion 1100 from the STA in the BSS and may transmit it to the AP. The AP may determine (or control) the CCA threshold of the BSS on the basis of the BSS idle ratio/portion 1100.

The CCA threshold between BSSs may be mutually shared between the BSSs. For example, a plurality of BSSs may be included in an extended service set (ESS). The ESS may be a set of BSSs having the same service set identifier (SSID) connected by a distribution system (DS). That is, STAs included in the ESS may operate on the basis of the same CCA threshold.

An AP included in the BSS may transmit a beam frame by including information regarding the CCA threshold, and an STA in the BSS may acquire the information regarding the CCA threshold on the basis of the beacon frame. Further, an STA in a different BSS (neighbor BSS) may overhear the information regarding the CCA threshold of the BSS through the beacon frame. For an STA which does not receive the beacon frame, the information regarding the CCA threshold may be included in a probe response frame. Alternatively, the information regarding the CCA threshold may be included in an association response frame transmitted in an association procedure between the STA and the AP.

Alternatively, the AP may determine the CCA threshold on the basis of the MAC state information 1120 transmitted by the STA in the BSS. For example, the STA may transmit the MAC state information 1120 to the AP. The MAC state information 1120 may include at least one of information regarding a retransmission count of an uplink frame, a packet (or uplink data) transmission and/or reception success rate, an access and packet (or uplink data) transmission delay, etc.

Further, the AP may determine (or update) the CCA threshold of the BSS on the basis of the MAC state information 1120 of the STA. For example, if the STA continuously acquires a packet (or uplink frame) Tx opportunity but a failure in real packet (uplink frame) transmission is increased, a retransmission count of an uplink frame of the STA may be continuously increased. If the retransmission count of the uplink frame of the STA is increased, the AP may decrease the CCA threshold of the BSS. If the CCA threshold of the BSS is decreased, sensing sensitivity of a medium of the STA in the BSS may be increased. In this case, the STA is able to sense uplink frame transmission of a different STA in a more sensitive manner, and thus a transmission failure caused by a collision between frames in the BSS may be decreased.

For another example, it may be assumed a case where an access or packet (or uplink frame) delay of the STA is increased. In this case, the AP may increase the CCA threshold of the BSS. That is, if the medium is not acquired due to the sensing sensitivity for the medium of the STA, the CCA threshold of the BSS may be increased to decrease the sensing sensitivity for the medium.

The AP may determine (or determine) the CCA threshold of the BSS on the basis of the MAC state information 1120 of the STA, and may also determine (or update) the CCA threshold of the STA for each STA in the BSS. For example, if a retransmission count of an uplink frame of a specific STA included in the BSS is increased, the AP may decrease a CCA threshold of the specific STA. For another example, it may be assumed a case where an access and packet (or uplink frame) delay of the specific STA included in the BSS is increased. In this case, the AP may increase the CCA threshold of the specific STA.

Further, the AP may determine a CCA threshold for each STA included in the BSS on the basis of the per-STA distance/path loss or per-STA geometry information (STA location information) 1140. An STA located close to the AP (i.e., an STA located in a center of the BSS) has a relatively small interference caused by a neighbor BSS (or AP), and an STA located far from the AP (or an STA located in an edge of the BSS) may have a relatively great interference caused by the neighbor BSS (or AP). In this case, if the same CCA threshold is applied in the BSS, STAs located in the edge of the BSS may have a relatively less packet Tx opportunity than the STA located in the center of the BSS. Therefore, the AP may configure the CCA threshold differently on the basis of location information of the AP (or signal strength of the STA (e.g., received signal strength indication (RSSI))), and modulation and coding scheme (MCS) or the like used by the STA.

For example, the AP may determine the CCA threshold on the basis of information regarding transmission strength and reception strength of an uplink frame transmitted by the STA and information regarding MCS distribution of the STA.

If the STA is located in the edge of the BSS or if the STA persistently uses a low MCS, the AP may increase the CCA threshold. That is, a Tx opportunity of the STA may be increased by decreasing sensitivity of medium sensing of the STA. On the contrary, the STA may be located in the center of the BSS or the STA may persistently use a high MCS, and thus a transfer rate may be high but a packet error rate may also be high. In this case, the AP may decrease the CCA threshold.

FIG. 12 is a concept view illustrating a method of adjusting a transmission range and a CCA threshold of an STA by an AP according to an embodiment of the present invention.

Transmission by an STA located in an edge of a BSS may act as an interference to a neighbor BSS. Therefore, when the CCA threshold of the STA located in the edge of the BSS is increased to decrease sensitivity of medium sensing of the STA, system capability may deteriorate. Accordingly, the STA located in the edge of the BSS may decrease the interference to the neighbor BSS on the basis of a TPC-based operation.

The AP may increase an STA Tx opportunity (or channel access opportunity) by increasing a CCA threshold of an STA located in the edge of the BSS or located in an overlapping manner with the neighbor BSS. If the CCS threshold of the STA is increased, the sensitivity of the medium sensing of the STA may be decreased, and the STA Tx opportunity (or channel access opportunity) may be increased. According to an embodiment of the present invention, the AP may decrease the interference to the neighbor BSS by controlling transmit power while increasing the CCA threshold for the STA. The AP may decrease an interference range caused by the STA by decreasing the transmit power of the STA.

Further, the AP may allocate different transmission resources to a TPC STA and a non-TPC STA as described above with reference to FIG. 1 to FIG. 10. For example, the AP may configure a time resource for the non-TPC STA and a time resource for the TPC STA in a non-overlapping manner. Alternatively, the AP may configure a channel for the non-TPC STA and a channel for the TPC STA in a non-overlapping manner.

Referring to an upper portion of FIG. 12, the AP may increase a CCA threshold of an STA1 1210 as a TPC STA to −72 dBm, and may decrease transmit power of the STA1 1210. Further, the AP may configure respective time resources for uplink data transmission of the STA1 1210 as the TPC STA and of an STA3 1230 as a non-TPC STA in a non-overlapping manner. When using this method, a Tx opportunity for the STA1 1210 may be increased, and an interference to a neighbor BSS caused by the STA1 1210 may be decreased. Further, a possibility of an inter-frame collision in a BSS caused by a decrease in transmission coverage of the STA1 1210 may be decreased by separately allocating a time resource for transmission of an uplink frame of the STA1 1210.

Referring to a lower portion of FIG. 12, the AP may increase a CCA threshold of an STA2 1220 as a TPC STA, and may decrease transmit power of the STA2 1220. Further, the AP may configure respective channel resources for uplink data transmission of the STA2 1220 as the TPC STA and of an STA4 1240 as a non-TPC STA in a non-overlapping manner. When using this method, a Tx opportunity for the STA2 1220 may be increased, and an interference to a neighbor BSS caused by the STA2 1220 may be decreased. Further, a possibility of an inter-frame collision in a BSS caused by a decrease in transmission coverage of the STA2 1220 may be decreased by separately allocating a channel for transmission of an uplink frame of the STA2 1220.

According to an embodiment of the present invention, although the transmit power of the TPC STA is determined on the basis of the CCA threshold of the TPC STA, the CCA threshold of the TPC STA may also be determined on the basis of the transmit power of the TPC STA. That is, the CCA threshold configured by the TPC STA and the transmit power of the TPC STA may be determined dependently on the basis of a specific relation. For example, when the transmit power of the TPC STA is set to decrease from a previous value of the transmit power, the CCA threshold of the TPC STA may be increased as much as the transmit power has been decreased. On the contrary, when the transmit power is set to increase from a previous value of the transmit power, the CCA threshold of the TPC STA may be decreased as much as the transmit power of a wireless station has been increased.

That is, the aforementioned operation of the TPC STA may be similar to an operation of a case where a virtual small BSS having a relatively short transmission and reception range exists in one BSS. On the basis of the control of the AP with respect to the TPC STA, transmission or reception of the STA can be effectively adjusted in a dense multi-BSS environment.

The method of allocating different transmission resources to the TPC STA and the non-TPC STA disclosed in FIG. 5 to FIG. 10, the method of configuring the CCA threshold on the basis of the AP disclosed in FIG. 11, and the method of adjusting the transmission range and the CCA threshold of the STA by the AP disclosed in FIG. 12 may be used individually, or the respective methods may be used for a WLAN system in an integral manner. The aforementioned methods may be properly selected for use according to a system environment.

Figure 13:
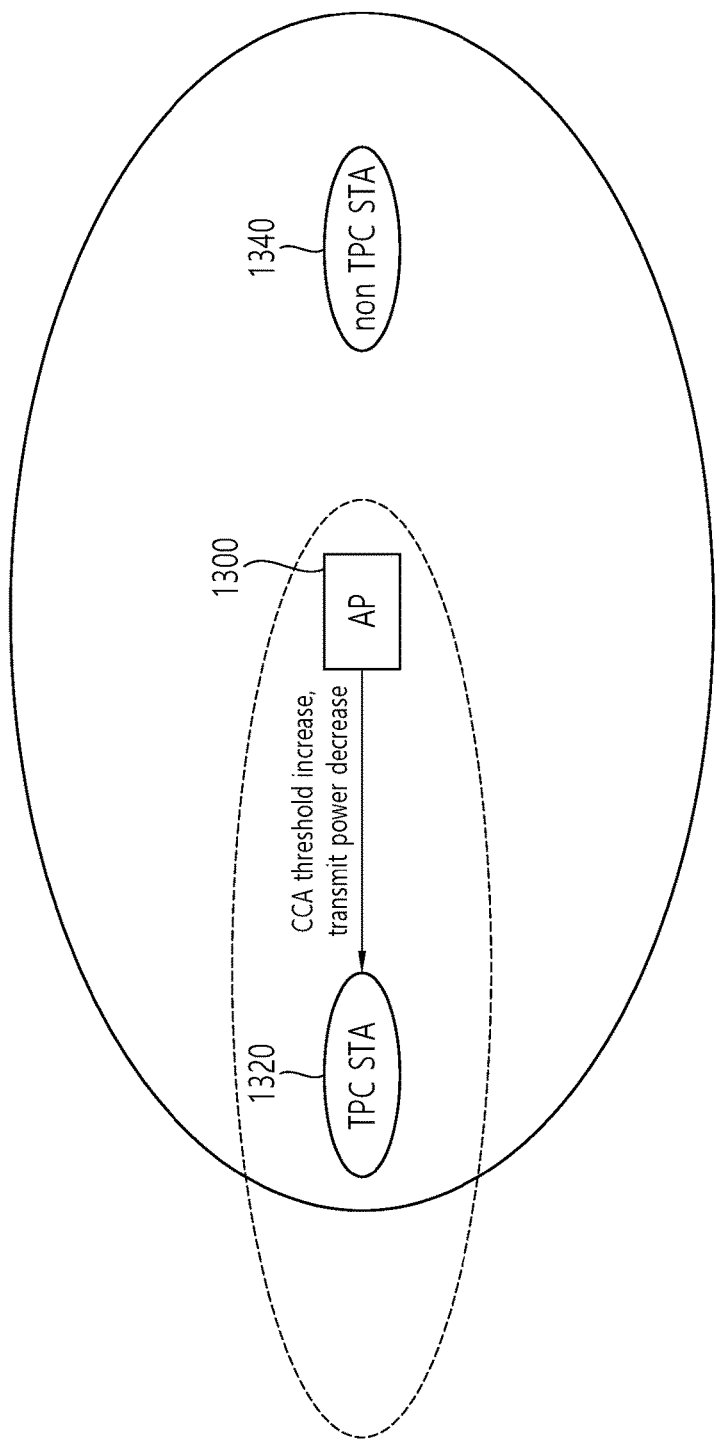
FIG. 13 is a concept view illustrating a method of adjusting transmit coverage and a CCA threshold of an STA by an AP according to an embodiment of the present invention.

FIG. 13 is a concept view illustrating a method of adjusting transmit coverage and a CCA threshold of an STA by an AP according to an embodiment of the present invention.

In FIG. 13, it is proposed a method of adjusting a transmission range or a CCA threshold of a TPC STA 1320 by an AP for fairness of communication resource distribute between the TPC STA 1320 and a non-TPC STA 1340. The non-TPC STA 1340 may be a legacy STA not supporting a TPC-based operation.

Referring to FIG. 13, the TPC STA 1320 and the non-TPC STA 1340 may operate in a BSS. When an AP configures the CCA threshold of the TPC STA 1320 to be relatively high (e.g., −72 dBm), sensitivity of medium sensing of the TPC STA 1320 may be decreased. In this case, the TPC STA 1320 may have a relatively greater number of Tx opportunities than the non-TPC STA 1340. On the contrary, when the CCA threshold for the non-TPC STA 1340 is configured to be relatively low (e.g., −82 dBm), the sensitivity of medium sensing of the TPC STA 1320 may be increased. In this case, the TPC STA 1320 may have a relatively smaller number of Tx opportunities than the non-TPC STA 1340.

An AP 1300 may decrease transmit power of the TPC STA 1320 for the fairness of the communication resource distribution between the non-TPC STA 1340 and the TPC STA 1320. If the transmit power of the TPC STA 1320 is decreased, the transmit coverage of the TPC STA 1320 may be decreased, and an interference for the non-TPC STA 1340 may be decreased. That is, the AP 1300 may control the transmit power of the TPC STA 1320, and an uplink frame of the TPC STA 1320 sensed by the non-TPC STA 1340 may be decreased. Therefore, a Tx opportunity of the non-TPC STA 1340 may be relatively increased.

The transmit power may be decreased along with an increase in a CCA threshold (or CCA level). For example, if a difference between the CCA threshold is xdB, the transmit power may be decreased by xdB by applying the difference of the CCA levels to the transmit power. Alternatively, the transmit power may be determined on the basis of a function in which the difference between the CCA thresholds is used as an input value.

For example, a transmit power level P may be f(x)+a. f(x) may be a function in which a difference between CCA thresholds is used as an input value, and 'x' may be a difference between CCA thresholds between the TPC STA 1320 and the non-TPC STA 1340. 'a' may be a system variable determined on the basis of the number of STAs in a BSS or a BSS range.

For example, if a CCA threshold of the non-TPC STA 1340 is −82 dBm and a CCA threshold of the TPC STA 1320 is −72 dBm, the transmit power level of the TPC STA 1320 may be determined to have a difference of 10 dB with respect to the transmit power level of the non-TPC STA 1340, and may be determined to have a difference of 0 to 10 dB by considering another system variable.

If it is determined that the transmit power level of the TPC STA 1320 and the transmit power level of the non-TPC STA 1340 have a difference of 10 dB, the transmit power of the TPC STA 1320 may be P−10 (dBm) when the transmit power of the non-TPC STA 1340 is P (dBm).

If a CCA threshold is configured for each of a plurality of STAs in a BSS (or a user-specific CCA threshold is applied for each of the plurality of STAs), transmit power of each of the plurality of STAs may be determined on the basis of a CCA threshold configured for each of the plurality of STAs (or user-specific CCA threshold).

Figure 14:
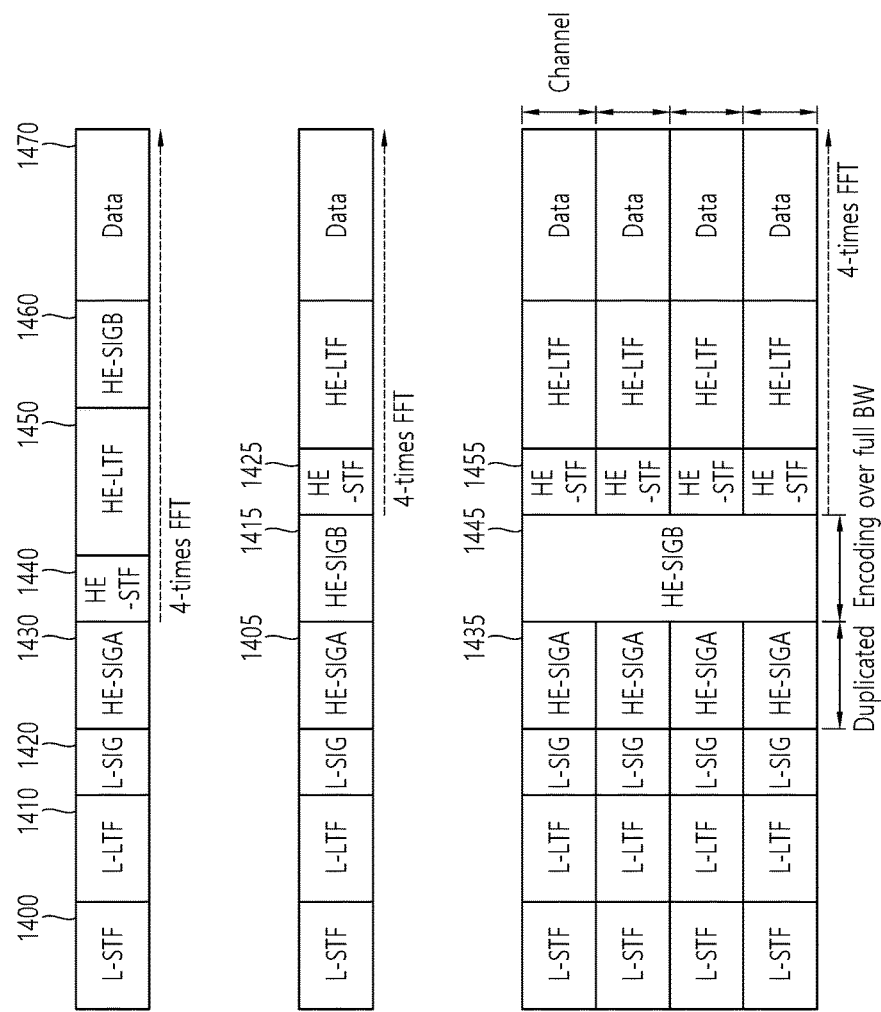
FIG. 14 is a concept view illustrating a physical layer protocol data unit (PPDU) format for frame transmission according to an embodiment of the present invention.

FIG. 14 is a concept view illustrating a PPDU format for frame transmission according to an embodiment of the present invention.

In FIG. 14, it is disclosed a PPDU format according to an embodiment of the present invention. The PPDU format disclosed in FIG. 14 may be used to deliver the aforementioned frame (e.g., a beacon frame, a TPC configuration request frame, a TPC configuration response frame, etc.).

Referring to an upper portion of FIG. 14, the PHY header of the downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PHY header may be divided into a legacy part before the L-SIG and a high efficiency (HE) part after the L-SIG.

An L-STF 1400 may include a short training orthogonal frequency division multiplexing (OFDM) symbol. The L-STF 1400 may be used for frame detection, automatic gain control (AGC), diversity detection, and coarse frequency/time synchronization.

An L-LTF 1410 may include a long training OFDM symbol. The L-LTE 1410 may be used for fine frequency/time synchronization and channel prediction.

An L-SIG 1420 may be used to transmit control information. The L-SIG 1420 may include information for a data rate and a data length. As described above, the legacy STA may configure a network allocation vector (NAV) on the basis of information included in the L-SIG.

An HE-SIG A 1430 may include information for indicating an STA for receiving a PPDU. For example, the HE-SIG A 1430 may include an identifier of a specific STA for receiving the PPDU and information for indicating a group of the specific STA. Further, if the PPDU is transmitted on the basis of orthogonal frequency division multiple access (OFDMA) or multiple input multiple output (MIMO), the HE-SIG A 1430 may also include resource allocation information for the STA.

Alternatively, the HE-SIG A 1430 may include a transmission resource for the TPC STA (e.g., a TPC STA time resource, a TPC STA channel, etc.) and information regarding transmit power of the TPC STA.

Further, the HE-SIG A 1430 may include color bit information for BSS identification information, bandwidth information, a tail bit, a CRC bit, modulation and coding scheme (MCS) information for an HE-SIG B 1460, symbol count information for the HE-SIG B 1460, and cyclic prefix (CP) (or guard interval (GI)) length information.

An HE-STF 1440 may be used to improve automatic gain control estimation in an MIMO environment or an OFDMA environment.

An HE-LTF 1450 may be used to estimate a channel in the MIMO environment or the OFDMA environment.

The HE-SIG B 1460 may include a length of physical layer service data unit (PSDU) for each STA, information regarding modulation and coding scheme (MCS), a tail bit, or the like. Further, the HE-SIG B 1460 may include information for the STA for receiving the PPDU and OFDMA-based resource allocation information (or MU-MIMO information). If the OFDMA-based resource allocation (or MU-MIMO related information) is included in the HE-SIG B 1460, resource allocation information may not be included in the RE-SIG A 1430.

A size of IFFT applied to the HE-STF 1440 and a field next to the HE-STF 1440 may be different from a size of IFFT applied to a field prior to the HE-STF 1440. For example, the size of IFFT applied to the HE-STF 1440 and the field next to the HE-STF 1440 may be four times greater than the size of IFFT applied to the field prior to the HE-STF 1440. The STA may receive the HE-SIG A 1430, and may be instructed to receive a downlink PPDU on the basis of the HE-SIG A 1430. In this case, the STA may perform decoding on the HE-STF 1440 and the field next to the HE-STF 1440 on the basis of a changed FFT size. On the contrary, if the STA is not instructed to receive the downlink PPDU on the basis of the HE-SIG A 1430, the STA may stop decoding and may configure a network allocation vector (NAV). A cyclic prefix (CP) of the HE-STF 1440 may have a size greater than a CP of another field, and for this CP duration, the STA may perform decoding on the downlink PPDU by changing the FFT size.

An order of the field constructing the format of the PPDU disclosed in the upper portion of FIG. 14 may be changed. For example, as disclosed in a middle portion of FIG. 14, an HE-SIG B 1415 of an HE part may be located immediately next to an HE-SIG A 1405. The STA may perform decoding on the HE-SIG 1405 and up to the HE-SIG B 1415, may receive necessary control information, and may configure an NAV. Likewise, a size of IFFT applied to an HE-STF 1425 and a field next to the HE-STF 1425 may be different from a size of IFFT applied to a field prior to the HE-STF 1425.

The STA may receive the HE-SIG A 1405 and the RE-SIG B 1415. If it is instructed to receive the downlink PPDU by the STA identifier field of the HE-SIG A 1405, the STA may perform decoding on the downlink PPDU starting from the HE-STF 1425 by changing the FFT size. On the contrary, the STA may receive the HE-SIG A 1405, and if it is not instructed to receive the downlink PPDU on the basis of the HE-SIG A 1405, may configure the NAV.

Referring to a lower portion of FIG. 14, a downlink PPDU format for DL MU transmission is disclosed. According to an embodiment of the present invention, an AP may transmit a downlink frame or a downlink PPDU to a plurality of STAs by using a PPDU format for DL MU transmission. A plurality of downlink PPDUs may be transmitted respectively to the plurality of STAs through different transmission resources (frequency resources or spatial streams). For example, the AP may transmit downlink data for a TPC STA to the TPC STA through a TPC STA channel on the basis of a PPDU format for DL MU transmission, and may transmit downlink data for a non-TPC STA through a non-TPC STA channel.

A field prior to an HE-SIG B 1445 on the PPDU may be transmitted in a duplicated form in each of different uplink transmission resources. The HE-SIG B 1445 may be transmitted on all transmission resources in an encoded form. A field next to the HE-SIG B 1445 may include individual information for each of the plurality of STAs for receiving the PPDU.

If the field included in the PPDU is transmitted through each of the downlink transmission resources, a CRC for each field may be included in the PPDU. On the contrary, if a specific field included in the PPDU is transmitted by being encoded on all downlink transmission resources, a CRC for each field may not be included in the PPDU. Therefore, an overhead for the CRC may be decreased.

Likewise, also in a PPDU format for DL MU transmission, an HE-STF 1455 and a field next to the HE-STF 1455 may be encoded on the basis of an IFFT size different from that of a field prior to the HE-STF 1455. Therefore, the STA may receive an HE-SIG A 1435 and the HE-SIG B 1445, and if it is instructed to receive the PPDU on the basis of the HE-SIG A 1435, may perform decoding on the PPDU by changing an FFT size.

Figure 15:
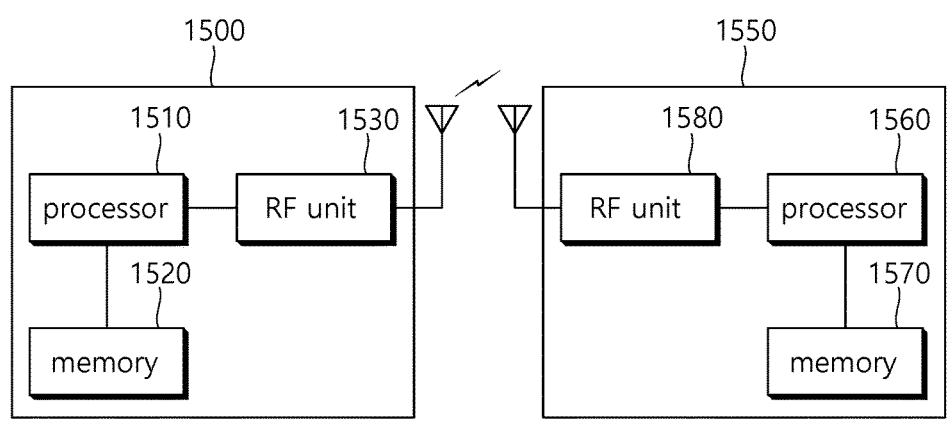
FIG. 15 is a block diagram illustrating a wireless device according to an embodiment of the present invention.

FIG. 15 is a block diagram illustrating a wireless device according to an embodiment of the present invention.

Referring to FIG. 15, a wireless device 1500 is an STA capable of implementing the aforementioned embodiment, and may be an AP 1500 or a non-AP STA (or STA) 1550.

The AP 1500 includes a processor 1510, a memory 1520, and a radio frequency (RF) unit 1530.

The RF unit 1530 may be coupled to the processor 1510 to transmit/receive a radio signal.

The processor 1510 may implement the functions, procedures, and/or methods proposed in the present invention. For example, the processor 1510 may be configured to perform an operation of the AP according to the aforementioned embodiment of the present invention. The processor may perform the operation of the AP disclosed in the embodiment of FIG. 1 to FIG. 14

For example, the processor 1510 may be configured to receive a TPC configuration request frame from an STA operating based on TPC and to transmit a TPC configuration response frame to the STA in response to the TPC configuration request frame. Further, the processor 1510 may be configured to decide whether to accept allocation for a communication resource requested on the basis of the TPC configuration request frame and/or transmit power requested on the basis of the TPC configuration request frame. The processor 1510 may be configured to generate a beacon frame including information regarding a communication resource and transmit power for the TPC-based operation and determined on the basis of the communication resource requested on the basis of the TPC configuration request frame and the requested transmit power.

An STA 1550 includes a processor 1560, a memory 1570, and an RF unit 1580.

The RF unit 1580 may be coupled to the processor 1560 to transmit/receive a radio signal.

The processor 1560 may implement the functions, procedures, and/or methods proposed in the present invention. For example, the processor 1520 may be configured to perform an operation of the STA according to the aforementioned embodiment of the present invention. The processor may perform the operation of the STA disclosed in the embodiment of FIG. 1 to FIG. 14.

For example, the processor 1560 may be configured to: transmit a TPC configuration request frame to the AP for a transmit power control (TPC)-based operation: receive a TPC configuration response frame from the AP in response to the TPC configuration request frame; and transmit a frame to the AP through a requested TPC STA communication resource. The TPC configuration request frame may include information on the TPC STA communication resource requested by the STA. The TPC configuration response frame may include information on allocation of the requested TPC STA communication resource. A non-TPC STA not operating based on the TPC may be restricted to use the requested TPC STA communication resource.

The TPC configuration request frame further may further include information on transmit power requested by the STA. The TPC configuration response frame may include information on acceptance of the requested transmit power. The frame transmitted by the STA may be transmitted with the requested transmit power. A magnitude of the requested transmit power may be less than a magnitude of transmit power of the non-TPC STA.

The requested TPC STA communication resource may be a time resource for the STA or a channel for the STA.

The processors 1510 and 1560 may include application-specific integrated circuits (ASICs), other chipsets, logical circuits, data processing devices, and/or converters for mutually converting a baseband signal and a radio signal. The memories 1520 and 1570 may include a read-only memory (ROM), a random access memory (RAM), a flash memory, a memory card, a storage medium and/or other storage devices. The RF units 1530 and 1580 may include at least one antenna to transmit and/or receive the radio signal.

When the above-described embodiment is implemented in software, the above-described scheme may be implemented using a module (process or function) which performs the above function. The module may be stored in the memories 1520 and 1570 may be and executed by the processors 1510 and 1560. The memories 1520 and 1570 may be disposed to the processors 1510 and 1560 internally or externally and connected to the processors 1510 and 1560 using a variety of well-known means.

What is claimed is:

1. A method of configuring parameters used for transmitting a physical layer protocol data unit (PPDU) in a wireless local area network (WLAN), the method comprising:
    configuring, by a station, a clear channel assessment (CCA) threshold based on whether or not the CCA threshold is used for an overlapping basic service set (BSS) of the station, the overlapping BSS being a BSS of the station that has a coverage that overlaps with a coverage of a BSS of another station,
    wherein the CCA threshold for the overlapping BSS is configured based on a transmit power to be used for the PPDU;
    performing, by the station, a channel assessment based on the CCA threshold;
    transmitting, by the station, the PPDU to an Access Point (AP) only when a wireless medium is determined to be idle as a result of the channel assessment,
    wherein the PPDU comprises a legacy part followed by a high efficient (HE) part,
    wherein the HE part includes a HE short training field (HE-STF), a HE long training field (HE-LTF), and a data field, and
    wherein a size of an Inverse Fast Fourier Transform (IFFT) applied by the station to the HE part in an uplink frequency band is four times greater than a size of an IFFT applied by the station to the legacy part in the uplink frequency band.

2. The method of claim 1, wherein, when the CCA threshold is used for a BSS of the station that has a coverage that does not overlap with a coverage of any BSS of the another station, the CCA threshold for the target BSS is configured to be a constant value.

3. The method of claim 2, wherein the CCA threshold used for the BSS of the station that has the coverage that does not overlap with the coverage of any BSS of the another station is different from the CCA threshold for the overlapping BSS.

4. The method of claim 1, wherein, when the CCA threshold is used for the overlapping BSS, and when the transmit power is set to decrease from a previous value of the transmit power, the CCA threshold for the overlapping BSS increases as much as the transmit power decreases.

5. A station (STA) configuring parameters used for transmitting a physical layer protocol data unit (PPDU) in a wireless local area network (WLAN), the STA comprising:
    a radio frequency (RF) unit configured to transmit or receive a radio signal; and
    a processor operatively coupled to the RF unit,
    wherein the processor is configured to:
        configure a clear channel assessment (CCA) threshold based on whether or not the CCA threshold is used for an overlapping basic service set (BSS) of the station, the overlapping BSS being a BSS of the station that has a coverage that overlaps with a coverage of a BSS of another station,
        wherein the CCA threshold for the overlapping BSS is configured based on a transmit power to be used for the PPDU,
        perform a channel assessment based on the CCA threshold, and
        transmit the PPDU to an Access Point (AP) only when a wireless medium is determined to be idle as a result of the channel assessment,
        wherein the PPDU comprises a legacy part followed by a high efficient (HE) part,
        wherein the HE part includes a HE short training field (HE-STF), a HE long training field (HE-LTF), and a data field, and
        wherein a size of an Inverse Fast Fourier Transform (IFFT) applied to the HE part in an uplink frequency band is four times greater than a size of an IFFT applied to the legacy part in the uplink frequency band.

6. The STA of claim 5, wherein, when the CCA threshold is used for a BSS of the station that has a coverage that does not overlap with a coverage of any BSS of the another station, the CCA threshold for the target BSS is configured to be a fixed value.

7. The STA of claim 6, wherein the CCA threshold used for the BSS of the station that has the coverage that does not overlap with the coverage of any BSS of the another station is different from the CCA threshold for the overlapping BSS.

8. The STA of claim 5, wherein, when the CCA threshold is used for the overlapping BSS, and when the transmit power is set to decrease from a previous value of the transmit power, the CCA threshold for the overlapping BSS increases as much as the transmit power decreases.

* * * * *